United States Patent
Shao et al.

(10) Patent No.: US 11,959,777 B2
(45) Date of Patent: Apr. 16, 2024

(54) METHODS AND INTERNET OF THINGS (IOT) SYSTEMS FOR SAFETY MANAGEMENT OF SMART GAS UNDERGROUND GAS PIPELINE NETWORKS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/339,222

(22) Filed: Jun. 21, 2023

(65) Prior Publication Data
US 2023/0332935 A1 Oct. 19, 2023

(30) Foreign Application Priority Data
May 24, 2023 (CN) .......................... 202310586593.3

(51) Int. Cl.
*G01D 21/02* (2006.01)
(52) U.S. Cl.
CPC .................... *G01D 21/02* (2013.01)
(58) Field of Classification Search
CPC .... G01D 21/02; G06N 20/00; G06Q 10/0635; G06Q 10/20; G06Q 50/06; Y02P 90/02
See application file for complete search history.

(56) References Cited

U.S. PATENT DOCUMENTS

2002/0184069 A1  12/2002  Kosiba et al.
2007/0094162 A1  4/2007  Aragones et al.
(Continued)

FOREIGN PATENT DOCUMENTS

CN   107632581 B   5/2020
CN   112434861 A   3/2021
(Continued)

OTHER PUBLICATIONS

Hu, Xinzhou, Research on Design and Implementation of Monitoring & Control System for Natural Gas Transsion & Distribution Network in S Province, China Master's Thesis Full-text Database Information Technology Series I, 2020, 140 pages.
(Continued)

*Primary Examiner* — Yoshihisa Ishizuka
(74) *Attorney, Agent, or Firm* — METIS IP LLC

(57) ABSTRACT

The embodiment of the present disclosure provides a method and an Internet of Things (IoT) system for safety management of a smart gas underground gas pipeline network. The method is implemented by a smart gas safety management platform and includes: obtaining basic monitoring information of at least one pipeline network partition collected by distributed monitoring components arranged at a plurality of monitoring points; determining at least one key monitoring point and monitoring content of the at least one key monitoring point; determining an inspection plan and a performance allocation plan for the smart gas safety management platform; adjusting the preset monitoring frequency of the distributed monitoring components located at different key monitoring points and at areas surrounding the different key monitoring points; and generating an alarm message to be sent to a user terminal based on an inspection result of the inspection robot.

9 Claims, 7 Drawing Sheets

(56) References Cited

U.S. PATENT DOCUMENTS

| | | |
|---|---|---|
| 2007/0294406 A1 | 12/2007 | Suer et al. |
| 2017/0102683 A1 | 4/2017 | Bharti et al. |
| 2018/0119844 A1* | 5/2018 | Wayman .............. G01N 29/024 |
| 2019/0072943 A1 | 3/2019 | Przybylski |
| 2019/0213516 A1 | 7/2019 | Zhuravel et al. |
| 2019/0273783 A1 | 9/2019 | Shao |
| 2021/0073692 A1 | 3/2021 | Saha et al. |
| 2023/0123092 A1 | 4/2023 | Shao et al. |
| 2023/0153827 A1 | 5/2023 | Shao et al. |

FOREIGN PATENT DOCUMENTS

| | | | |
|---|---|---|---|
| CN | 113077101 A | 7/2021 | |
| CN | 214171974 U | 9/2021 | |
| CN | 114444988 A | 5/2022 | |
| CN | 114925607 A | 8/2022 | |
| CN | 115496625 A | 12/2022 | |
| CN | 115619071 A | 1/2023 | |
| CN | 115907264 A | 4/2023 | |
| CN | 116011740 A | 4/2023 | |
| KR | 102369991 B1 | 3/2022 | |
| WO | WO-2012153147 A1 * | 11/2012 | .............. F17D 1/08 |
| WO | 2019200662 A1 | 10/2019 | |
| WO | WO-2020215117 A1 * | 10/2020 | ............. E03B 7/003 |
| WO | 2022121026 A1 | 6/2022 | |

OTHER PUBLICATIONS

Su, Qingwei, Research on Safety Problems and Inspection Scheme Optimization of Natural Gas Station Pipeline, Chemical Enterprise Management, 108-111, 2022.

Ke, Xiangqian, Research on Optimization of In-service Inspection Scheme for Natural Gas Station Pipeline Based on RBI, China Master's Thesis Full-text Database Information Technology Series I, 2020, 109 pages.

Zhao, Hui, Research and Application of Service Composition and Integration for Typical Industrial Equipment Detection and Monitoring, China Master's Thesis Full-text Database Information Technology Series, 2020, 66 pages.

Shi, Yue et al., A Safety Management System for Natural Gas Pipeline in Subsidence Area of Coal Mine, Energy Sources, Part A: Recovery, Utilization, and Environmental Effects, 44(3): 5766-5783, 2022.

Wang, Qingfeng et al., Development and Application of Equipment Maintenance and Safety Integrity Management System, Journal or Loss Prevention in the Process Industries, 24(4): 321-332, 2011.

Gas Safety Intelligent Management Platform Introduction, Web page <http://www.trzhineng.cn/NewsStd_939.html>, May 27, 2020.

The Main Functional Advantages of the Integrated Platform System for Smart Gas Safety Operation, Web page <https://zhuanlan.zhihu.com/ p/605103414>, Feb. 10, 2023.

* cited by examiner

200

```
210 — Obtaining basic monitoring information of at least one pipeline network partition collected by distributed monitoring components arranged at a plurality of monitoring points, the basic monitoring information being collected at a preset monitoring frequency 220 — Determining at least one key monitoring point and monitoring content of the at least one key monitoring point based on the basic monitoring information, a pipeline network structure map, and a gas pipeline feature in a pipeline corridor 230 — Determining an inspection plan and a performance allocation plan for the smart gas safety management platform based on the at least one key monitoring point and the monitoring content of the at least one key monitoring point and the basic monitoring information 240 — Adjusting the preset monitoring frequency of the distributed monitoring components located at different key monitoring points and areas surrounding the different key monitoring points based on the performance allocation plan for the smart gas safety management platform 250 — Generating an alarm message to be sent to a user terminal based on an inspection result of the inspection robot
```

FIG. 2

METHODS AND INTERNET OF THINGS (IOT) SYSTEMS FOR SAFETY MANAGEMENT OF SMART GAS UNDERGROUND GAS PIPELINE NETWORKS

CROSS-REFERENCE TO RELATED APPLICATION

The application claims priority of Chinese Patent Application No. 202310586593.3, filed on May 24, 2023, the entire contents of which are incorporated herein by reference.

TECHNICAL FIELD

The present disclosure relates to the field of gas safety, and in particular, to a method and an Internet of Things (IoT) system for safety management of a smart gas underground gas pipeline network.

BACKGROUND

As gas is more and more widely used in life, there are more and more safety issues related to gas. Compared with a rapid development of underground gas pipeline networks, management of underground gas pipeline networks appear to be lagging behind. It has been unable to meet safety requirements of the pipeline corridor business and has restricted development of the gas pipeline corridors to a large extent.

Aiming at the problem of how to manage safety of the underground gas pipeline network, CN107632581B proposes a monitoring and management system for an underground pipeline corridor. The focus of this application is to realize automatic monitoring and real-time reporting of data, use inspection robots to conduct inspection of preset items in underground pipeline corridors, and report real-time data obtained from the inspection to a data analysis and evaluation system. However, due to complex and changeable situations of underground gas pipeline networks, it is still necessary to conduct research on information-based smart safety management optimization for the underground gas pipeline networks.

Therefore, it is hoped to provide safety management method and an Internet of Things system for a smart gas underground gas pipeline network to improve monitoring efficiency of the gas pipeline network and accuracy of monitoring results.

SUMMARY

One or more embodiments of this disclosure provide a method for safety management of a smart gas underground gas pipeline network. The method is implemented by a smart gas safety management platform of an Internet of Things system for safety management of the smart gas underground gas pipeline network, and the method includes: obtaining basic monitoring information of at least one pipeline network partition collected by distributed monitoring components arranged at a plurality of monitoring points, the basic monitoring information being collected at a preset monitoring frequency; determining at least one key monitoring point and monitoring content of the at least one key monitoring point based on the basic monitoring information, a pipeline network structure map, and a gas pipeline feature in a pipeline corridor; determine an inspection plan and a performance allocation plan for the smart gas safety management platform based on the at least one key monitoring point and the monitoring content of the at least one key monitoring point and the basic monitoring information, and the inspection plan being executed by at least one type of inspection robot, the performance allocation plan for the smart gas safety management platform at least including a maximum performance occupancy of the smart gas safety management platform for processing monitoring data, and the monitoring data referring to data in areas where different key monitoring points are located; adjusting the preset monitoring frequency of the distributed monitoring components located at different key monitoring points and at areas surrounding the different key monitoring points based on the performance allocation plan for the smart gas safety management platform; and generating an alarm message to be sent to a user terminal based on an inspection result of the inspection robot.

One or more embodiments of the present disclosure provide the Internet of Things (IoT) system for safety management of the smart gas underground gas pipeline network. The Internet of Things (IoT) system includes a smart gas user platform, a smart gas service platform, a smart gas safety management platform, a smart gas pipeline network device sensing network platform, and a smart gas pipeline network device object platform that interact in sequence, and the smart gas safety management platform is configured to: obtain basic monitoring information of at least one pipeline network partition collected by distributed monitoring components arranged at a plurality of monitoring points based on the smart gas pipeline network device object platform through the smart gas pipeline network device sensor network platform, the basic monitoring information being collected at a preset monitoring frequency; determine at least one key monitoring point and monitoring content of the at least one key monitoring point based on the basic monitoring information, a pipeline network structure map, and a gas pipeline feature in a pipeline corridor; determine an inspection plan and a performance allocation plan for the smart gas safety management platform based on the at least one key monitoring point and the monitoring content of the at least one key monitoring point and the basic monitoring information, and the inspection plan being executed by at least one type of inspection robot, the performance allocation plan for the smart gas safety management platform at least including a maximum performance occupancy of the smart gas safety management platform for processing monitoring data, and the monitoring data referring to data in areas where different key monitoring points are located; adjust the preset monitoring frequency of the distributed monitoring components located at different key monitoring points and at areas surrounding the different key monitoring points based on the performance allocation plan for the smart gas safety management platform; and generate an alarm message based on an inspection result of the inspection robot, and send the alarm message to the smart gas user platform through the smart gas service platform.

One or more embodiments of the present disclosure provide a non-transitory computer-readable storage medium, which stores computer instructions, and when the computer reads the computer instructions in the storage medium, the computer implements the method for safety management of a smart gas underground gas pipeline network The present disclosure aims to solve the problem of how to improve monitoring efficiency of a gas pipeline network and accuracy of monitoring results. By determining the key monitoring points, executing the inspection plan through different types of inspection robots, and designing the performance allocation plan for the smart gas safety management platform in a targeted manner, the monitoring efficiency of gas pipeline corridors and the accuracy of monitoring results are improved while meeting inspection needs.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is an exemplary flowchart of a method for safety management of a smart gas underground gas pipeline network according to some embodiments of the present disclosure;

DETAILED DESCRIPTION

The drawings that need to be used in the descriptions of the embodiments will be briefly introduced below. The drawings do not represent all embodiments.

As used herein, the singular forms "a," "an," and "the" may be intended to include the plural forms as well, unless the context clearly indicates otherwise. It will be further understood that the terms "include" and/or "comprise," when used in this disclosure, specify the presence of steps and/or elements, but do not exclude the presence or addition of one or more other steps and/or elements thereof.

When the operations performed are described step by step in the embodiments of the present disclosure, unless otherwise specified, the order of the steps may be changed, the steps may be omitted, and other steps may also be included in the operation process.

Figure 1:
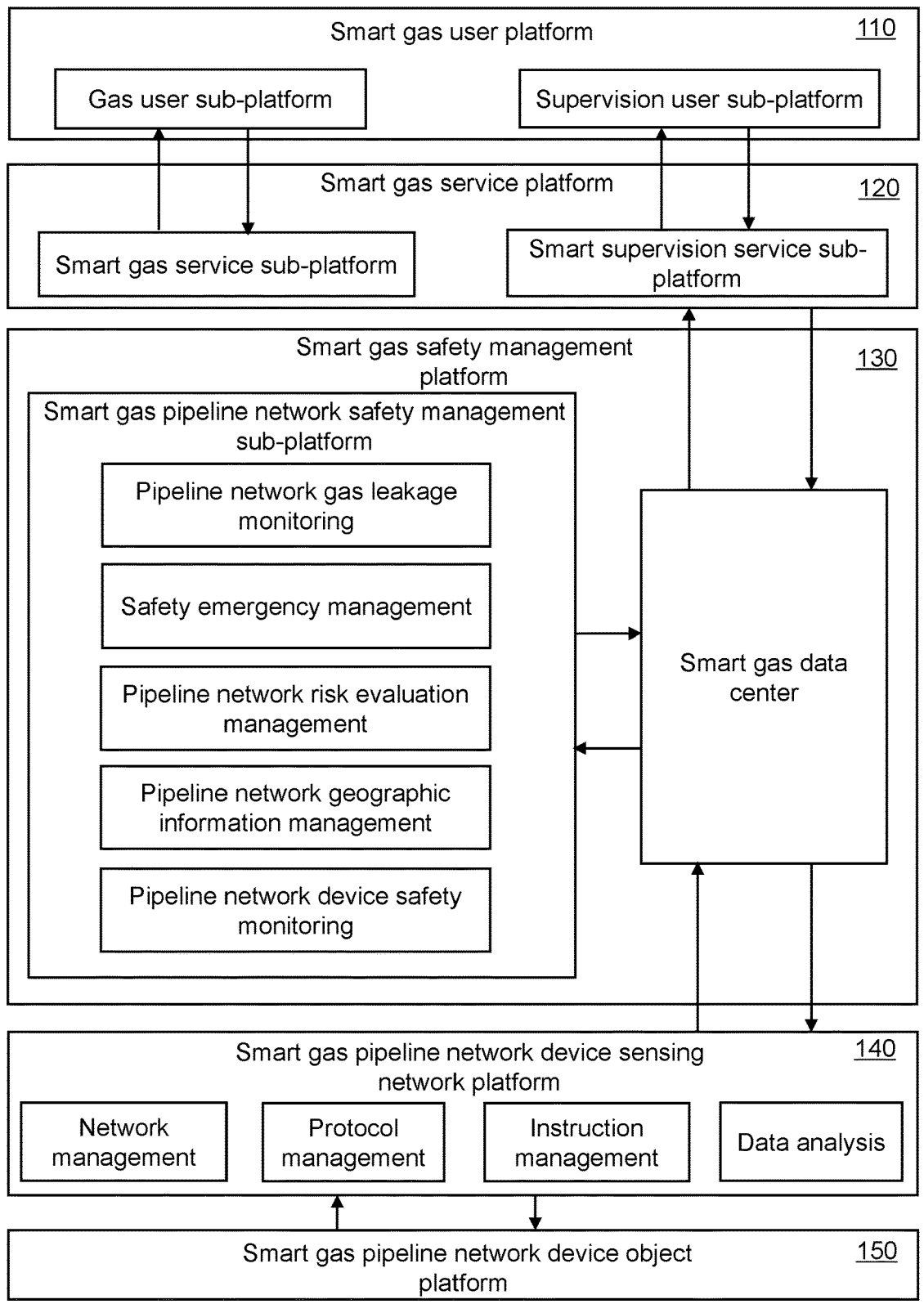
FIG. 1 is a platform structure diagram of an Internet of Things (IoT) system for safety management of a smart gas underground gas pipeline network according to some embodiments of the present disclosure.

FIG. 1 is a platform structure diagram of an Internet of Things (IoT) system for safety management of a smart gas underground gas pipeline network according to some embodiments of the present disclosure. The Internet of Things (IoT) system for safety management of the smart gas underground gas pipeline network involved in the embodiment of the present disclosure will be described in detail below. It should be noted that the following embodiments are only used to explain the disclosure, and do not constitute a limitation to the disclosure.

In some embodiments, as shown in FIG. 1, an IoT system 100 for safety management of a smart gas underground gas pipeline network may include a smart gas user platform 110, a smart gas service platform 120, a smart gas safety management platform 130, a smart gas pipeline network device sensing network platform 140, and a smart gas pipeline network device object platform 150.

The smart gas user platform 110 may be a platform for interacting with users. In some embodiments, the smart gas user platform 110 may be configured as a terminal device.

In some embodiments, the smart gas user platform 110 may include a gas user sub-platform and a supervision user sub-platform.

The gas user sub-platform may be used to provide gas users with relevant data on gas usage and solutions to gas problems. The gas users may be industrial gas users, commercial gas users, general gas users, etc.

The supervision user sub-platform may be used for supervise operation of the IoT system 100 for safety management of the smart gas underground gas pipeline network. Supervision users may be personnel of a safety management department.

In some embodiments, the smart gas user platform 110 may send an alarm message to the gas users based on the gas user sub-platform.

The smart gas service platform 120 may be a platform for communicating user needs and control information. The smart gas service platform 120 may obtain basic monitoring information or the like from the smart gas safety management platform 130 (for example, a smart gas data center), and send the basic monitoring information to the smart gas user platform 110.

In some embodiments, the smart gas service platform 120 may include a smart gas service sub-platform and a smart supervision service sub-platform.

The smart gas service sub-platform may be a platform that provides safe gas use service for gas users.

The smart supervision service sub-platform may be a platform that provides safety supervision service needs for supervisory users.

In some embodiments, the smart gas service platform 120 may send the alarm message to the supervision user sub-platform based on the smart supervision service sub-platform.

The smart gas safety management platform 130 may be a platform that coordinates connection and collaboration between various functional platforms, gathers all information of the Internet of Things system, and provides functions of perception management and control management for operation of the Internet of Things system. In some embodiments, the smart gas safety management platform 130 may be configured as a processor. The processor may be a single server or a server group. The server group may be centralized or distributed.

In some embodiments, the smart gas safety management platform may include a smart gas pipeline network safety management sub-platform and the smart gas data center.

The smart gas pipeline network safety management sub-platform may be a platform for managing the safety of an underground gas pipeline network. In some embodiments, the smart gas pipeline network safety management sub-platform may include, but is not limited to, a pipeline network gas leakage monitoring module, a safety emergency management module, a pipeline network risk evaluation management module, a pipeline network geographic information management module, and a pipeline network device safety monitoring module. The smart gas pipeline network safety management sub-platform may analyze and process relevant data on the safety of an underground gas pipeline network through the aforementioned management modules.

The smart gas data center may be used to store and manage all operating information of the IoT system 100. In some embodiments, the smart gas data center may be configured as a storage device for storing data (e.g., the basic monitoring information) related to the safety of the underground gas pipeline network or the like.

In some embodiments, the smart gas safety management platform 130 may perform information interaction with the smart gas service platform 120 and the smart gas pipeline network device sensing network platform 140 respectively through the smart gas data center. For example, the smart gas data center may send the data related to the safety of the underground gas pipeline network to the smart gas service platform 120 and send instructions for obtaining the data related to the safety of the underground gas pipeline network to the smart gas pipeline network device sensing network platform 140 to obtain relevant data of safety of a gas pipeline network device.

The smart gas pipeline network device sensing network platform 140 may be a functional platform for managing sensor communication. In some embodiments, the smart gas pipeline network device sensing network platform 140 may realize functions of sensing and controlling information sensing communication.

The smart gas pipeline network device object platform 150 may be a functional platform for generating perception information and executing control information. For example, the smart gas pipeline network device object platform 150 may monitor and generate the basic monitoring information.

In some embodiments of the present disclosure, based on the IoT system 100 for safety management of the smart gas underground gas pipeline network, a closed loop of information operation may be formed between the smart gas pipeline network device object platform and the smart gas user platform, and coordinated and regular operation under unified management of the smart gas management platform is achieved to make the safety management of the underground gas pipeline network information-based and smart.

FIG. 2 is an exemplary flowchart of a method for safety management of a smart gas underground gas pipeline network according to some embodiments of the present disclosure. In some embodiments, a process 200 may be executed by a smart gas safety management platform of an Internet of Things (IoT) system for safety management of a smart gas underground gas pipeline network.

As shown in FIG. 2, the process 200 includes the following steps.

Step 210: obtaining basic monitoring information of at least one pipeline network partition collected by distributed monitoring components arranged at a plurality of monitoring points. The basic monitoring information is collected at a preset monitoring frequency.

The monitoring point refers to a location where the underground gas pipeline network is monitored. In some embodiments, the plurality of monitoring points are provided with the distributed monitoring components.

The distributed monitoring components refer to related devices used to collect the basic monitoring information of the pipeline network partition, for example, various sensors (such as temperature sensors, humidity sensors, etc.) distributed in a pipeline corridor.

The pipeline network partition refers to a plurality of areas formed by dividing a pipeline network in advance. In some implementations, the pipeline network partition may be formed according to management areas of gas companies or according to districts, streets, etc.

The basic monitoring information refers to relevant information obtained when the pipeline network is being monitored. For example, the basic monitoring information may include a temperature, humidity, flammable gas, toxic gas, water accumulation, dust, etc.

The preset monitoring frequency refers to a preset frequency at which the distributed monitoring components collect information. In some embodiments, the preset monitoring frequency may be preset by those skilled in the art or set by default through the IoT system.

In some embodiments, the basic monitoring information is collected by the distributed monitoring components at the preset monitoring frequency.

Step 220: determining at least one key monitoring point and monitoring content of the at least one key monitoring point based on the basic monitoring information, a pipeline network structure map, and a gas pipeline feature in a pipeline corridor.

The pipeline network structure map refers to a structure map reflecting basic information of a pipeline network. In some embodiments, the pipeline network structure map may include information such as a layout direction of the pipeline network, a size of the pipeline network, a slope of the pipeline network, and an underground depth, etc.

The gas pipeline feature refers to relevant basic information of a gas pipeline, for example, a count of gas pipelines in the pipeline corridor, a size of the gas pipelines, joints and branches of the gas pipelines, etc.

The key monitoring points refer to locations that need to be monitored in the pipeline corridor. In some embodiments, the key monitoring points may be certain locations on a wall of the pipeline corridor, or a certain location of the gas pipeline in the pipeline corridor (for example, the joints or the branches of the gas pipeline, repaired places, etc.).

In some embodiments, the smart gas safety management platform may use abnormal content in the basic monitoring information as the monitoring content, for example, excessively high temperatures, abnormal levels of combustible gases, etc.

In some embodiments, the smart gas safety management platform may determine the at least one key monitoring point and the monitoring content of the at least one key monitoring point in various ways based on the basic monitoring information, the pipeline network structure map, and the gas pipeline feature in the pipeline corridor, for example, through a preset relationship comparison table or the like.

Figure 4:
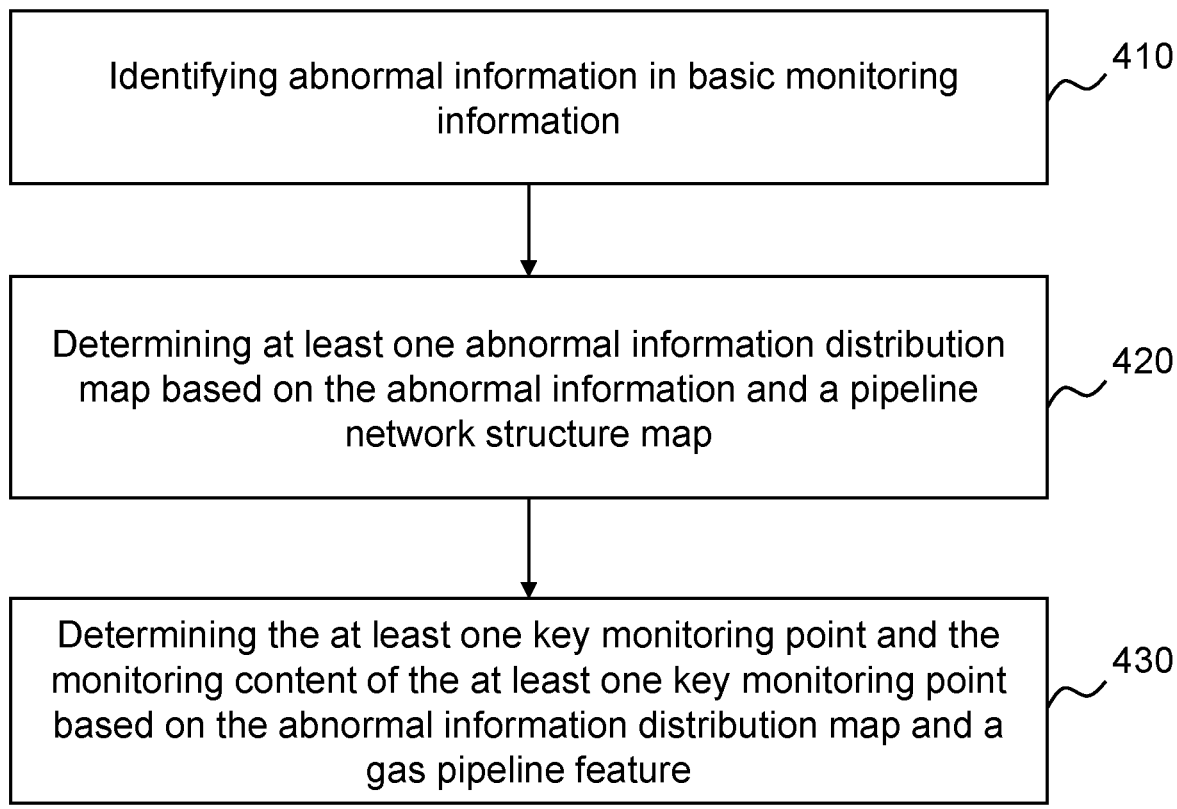
FIG. 4 is a flowchart illustrating an exemplary process for determining at least one key monitoring point and monitoring content of the at least one key monitoring point according to some embodiments of the present disclosure.

For some other embodiments of determining the at least one key monitoring point and the monitoring content of the at least one key monitoring point based on the basic monitoring information, the pipeline network structure map, and the gas pipeline feature in the pipeline corridor, please refer to relevant descriptions in FIG. 4.

Step 230: determining an inspection plan and a performance allocation plan for the smart gas safety management platform based on the at least one key monitoring point and the monitoring content of the at least one key monitoring point and the basic monitoring information.

The inspection plan refers to a plan for inspecting the gas pipeline network. In some embodiments, the inspection plan may be executed by at least one type of inspection robot.

The inspection robot refers to a robot that may detect and monitor information on pipeline corridors and pipelines and may move freely, for example, a special inspection robot, a composite inspection robot, etc. The special inspection robot may be smaller and more flexible and only monitor one type of monitoring information. The composite inspection robot may be large in size, with limited flexibility and short battery life, and efficiently monitors various types of monitoring information.

In some embodiments, the smart gas safety management platform may determine the inspection plan in various ways based on the at least one key monitoring point, the monitoring content of the at least one key monitoring point, and the basic monitoring information, for example, through a vector database, a preset relationship comparison table, etc.

Figure 7:
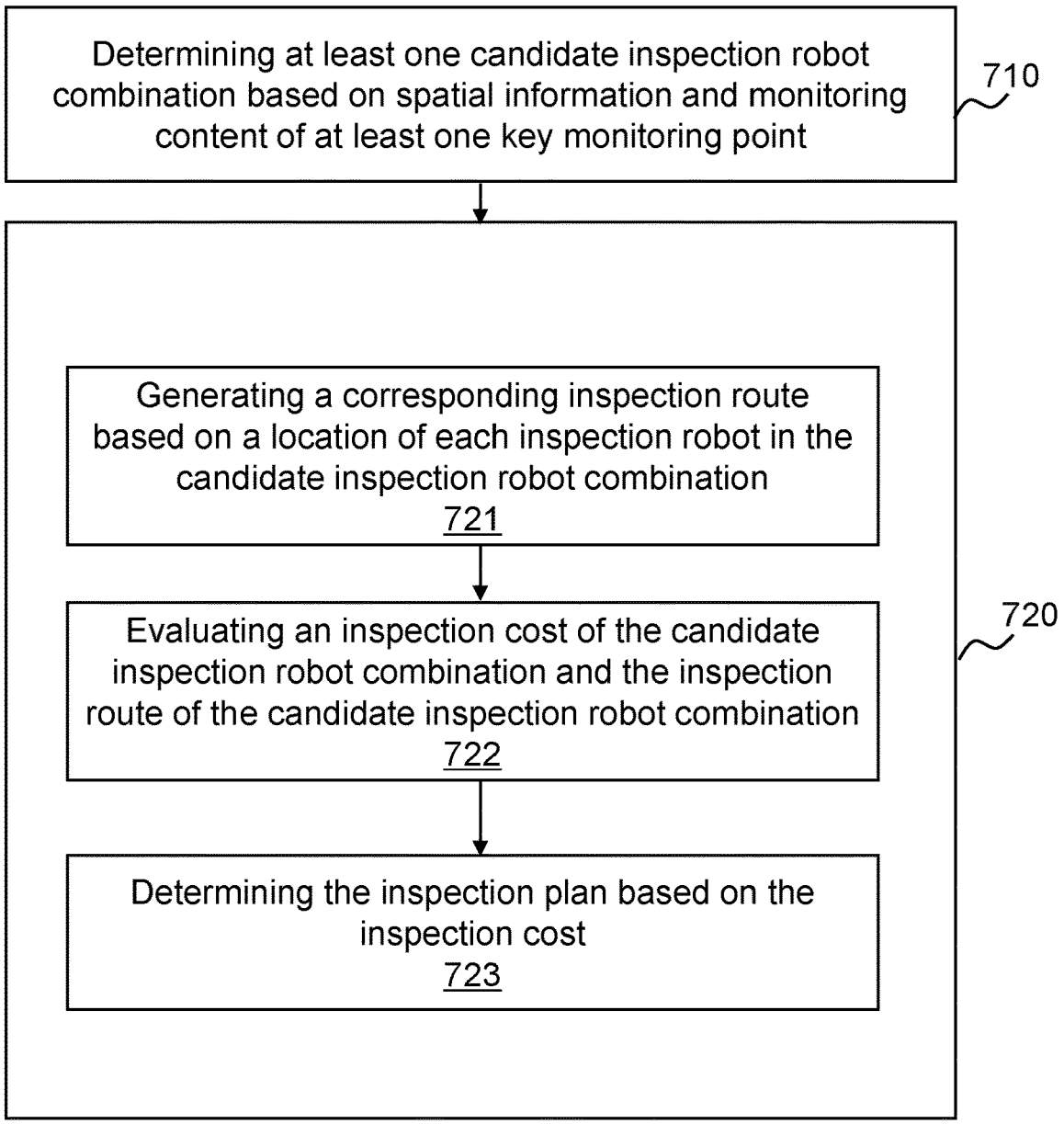
FIG. 7 is a flowchart illustrating an exemplary process for determining an inspection plan according to some embodiments of the present disclosure.

For some other embodiments of determining the inspection plan based on the at least one key monitoring point, the monitoring content of the at least one key monitoring point, and the basic monitoring information, please refer to the relevant descriptions in FIG. 7.

The performance allocation plan refers to a performance allocation plan for different monitoring data. In some embodiments, the performance allocation plan for the smart gas safety management platform may include at least a maximum performance occupancy of the smart gas safety management platform for processing monitoring data.

The monitoring data refers to data of areas where different key monitoring points are located, for example, a temperature value and a flammable gas content value of an area where the key monitoring point is located. In some embodiments, the monitoring data is monitored and obtained by the inspection robots and the distributed monitoring components.

In some embodiments, the smart gas safety management platform may determine the performance allocation plan in various ways based on the at least one key monitoring point, the monitoring content of the at least one key monitoring point, and the basic monitoring information, for example, through a vector database, a preset relationship comparison table, etc.

Figure 3:
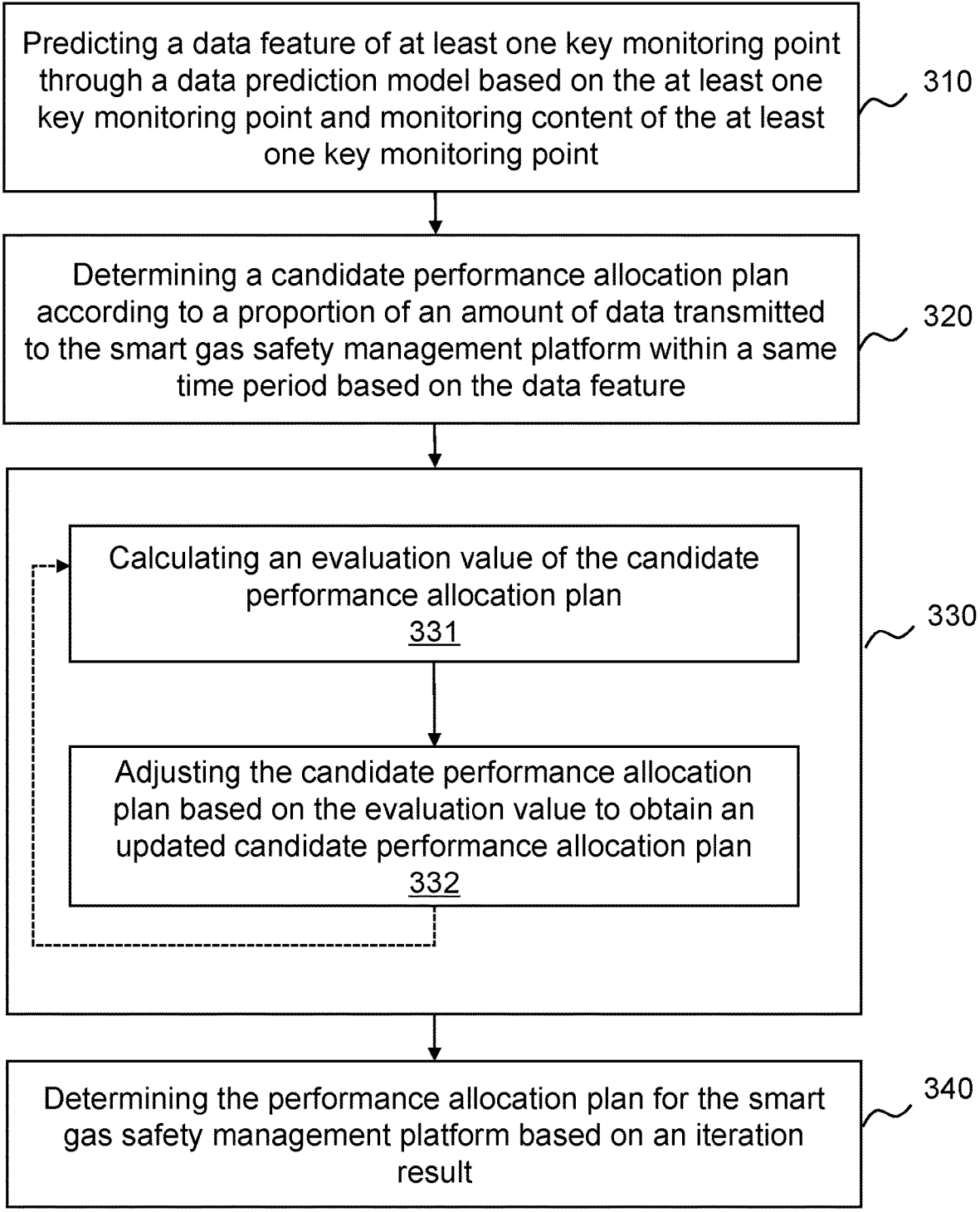
FIG. 3 is a flowchart illustrating an exemplary process for determining a performance allocation plan for a smart gas safety management platform according to some embodiments of the present disclosure.

For some other embodiments of determining the performance allocation plan for the smart gas safety management platform, please refer to related descriptions of FIG. 3.

Step 240: adjusting the preset monitoring frequency of the distributed monitoring components located at different key monitoring points and areas surrounding the different key monitoring points based on the performance allocation plan for the smart gas safety management platform.

The areas surrounding the different key monitoring points refer to areas within radii of preset distances with the different key monitoring points as different centers. The preset distances may be preset manually.

In some embodiments, a maximum processing capacity (such as how many MB of data may be processed per second) of the smart gas safety management platform for different key monitoring points is determined according to the performance allocation plan. The preset monitoring frequency is adjusted according to the maximum processing capacity to ensure that an amount of data obtained according to the preset monitoring frequency may not exceed the maximum processing capacity and thus cause the smart gas safety management platform to crash.

Step 250: generating an alarm message to be sent to a user terminal based on an inspection result of the inspection robot.

The inspection result refers to a result of the inspection of the key monitoring points by the inspection robot. For example, the inspection result may include normal and abnormal results.

The alarm message refers to a message for early warning of possible hidden dangers. In some embodiments, the alarm message may be sent to a user terminal in various forms. For example, a text "The temperature is too high", etc., may be sent to a user terminal.

In some embodiments, when the inspection result of the inspection robot is an abnormal result, the smart gas safety management platform may generate an abnormal point and abnormal content as the alarm message.

In some embodiments of the present disclosure, by determining the key monitoring points, executing the inspection plan by different types of inspection robots, and designing the performance distribution plan for the smart gas safety management platform in a targeted manner, inspection needs are met and at the same time, monitoring efficiency of the gas pipeline corridor and accuracy of the monitoring results are improved.

It should be noted that the above description about the process 200 is only for illustration and description, and does not limit the scope of application of the present disclosure. For those skilled in the art, various modifications and changes may be made to the process 200 under the guidance of the present disclosure. However, such modifications and changes are still within the scope of the present disclosure.

FIG. 3 is a flowchart illustrating an exemplary process for determining a performance allocation plan for a smart gas safety management platform according to some embodiments of the present disclosure. In some embodiments, a process 300 may be executed by a smart gas safety management platform.

As shown in FIG. 3, the process 300 includes the following steps.

Step 310: predicting a data feature of at least one key monitoring point through a data prediction model based on the at least one key monitoring point and monitoring content of the at least one key monitoring point.

The data feature refers to relevant information reflecting monitoring data. For example, the data feature may include a total amount of monitoring data, a data collection frequency, or the like. The total amount of monitoring data refers to a total amount of monitoring data of inspection robots and distributed monitoring components within a collection time. The data collection frequency refers to a ratio of the total amount of monitoring data to the collection time, that is, a frequency at which the inspection robots obtain data.

In some embodiments, the smart gas safety management platform may predict the data feature of the key monitoring point through the data prediction model based on the key monitoring points and the monitoring content of the key monitoring points.

The data prediction model refers to a machine learning model, for example, a neural network (NN) model or the like.

An input of the data prediction model may be the key monitoring points and the monitoring content the key monitoring points, and types of the inspection robots for inspection. The types of the inspection robots are obtained based on an inspection plan. An output of the data prediction model may be the data feature of key monitoring points, which may include the total amount of monitoring data and the data collection frequency.

In some embodiments, the data prediction model may be obtained through a plurality of labeled training samples. In some embodiments, training samples may at least include sample key monitoring points and monitoring content of the sample key monitoring points in historical data, and types of sample inspection robots. Labels may be historical data features of historical key monitoring points. The labels may be obtained based on manual labeling.

Step 320: determining a candidate performance allocation plan according to a proportion of an amount of data transmitted to the smart gas safety management platform within a same time period based on the data feature.

The proportion of the amount of data refers to a ratio of the total amount of monitoring data at each key monitoring point.

The candidate performance allocation plan refers to a candidate plan for allocating the performance of the smart gas safety management platform. In some embodiments, the key monitoring points that need to be processed by the smart gas safety management platform are different in each time period, and the candidate performance allocation plans may include allocation plans for different key monitoring points in different time periods.

In some embodiments, the smart gas safety management platform may determine the proportion of the amount of data transmitted to the smart gas safety management platform by each key detection point in each time period based on the data feature, and determine the proportion of the amount of data volume transmitted to the smart gas safety management platform as a performance allocation proportion of the each key detection point in the time period, and then determine the candidate performance allocation plan. For example, monitoring data of key monitoring points A, B, and C need to be processed within a time period T1, and monitoring data of key monitoring points C (not completely processed within the time period T1), D, and E need to be processed within a time period T2, then the candidate performance allocation plan may be [(T1, A, a, B, b, C, c), (T2, C, c, D, d, E, e), . . . ]. T1 and T2 are different time periods, and a, b, c, d, and e are corresponding performance distribution ratios of the key monitoring points A, B, C, D, and E in the time periods T1 and T2.

Step 330: performing a plurality of rounds of iteration on the candidate performance allocation plan until a first iteration completion condition is met.

In some embodiments, each of the plurality of rounds of iteration may include the following steps:

Step 331: calculating an evaluation value of the candidate performance allocation plan.

The evaluation value refers to a numerical value used to evaluate the candidate performance allocation plan. In some embodiments, the evaluation value of the candidate performance allocation plan may include a plurality of sub-evaluation values, wherein one key monitoring point corresponds to one sub-evaluation value.

In some embodiments, the sub-evaluation value may be related to data collection efficiency of the key monitoring points. For different key monitoring points, the total amount of monitoring data to be collected is fixed. If the performance of an allocated smart gas safety management platform is insufficient, data collection efficiency may be affected, for example, after collecting a portion of data and the smart gas safety management platform has not finished processing, data collection needs to be suspended.

In some embodiments, an impact on data collection efficiency may be represented by an increasing amount of a data collection time.

In some embodiments, according to the candidate performance allocation plan, a monitoring frequency under the performance allocation plan may be determined, so that data collection times corresponding to each key monitoring point may be determined. For each key monitoring point, the smart gas safety management platform may subtract a standard collection time of the key monitoring point from the collection time corresponding to the key monitoring point to determine the sub-evaluation value of the key monitoring point. Since the standard collection time is a collection time without a performance limit of the smart gas safety management platform, it should be a minimum collection time, and the sub-evaluation value may be positive or zero. The standard collection time of the key monitoring point may be determined based on a monitoring frequency that may be achieved without the performance limit of the smart gas safety management platform.

In some embodiments, the smart gas safety management platform may determine the evaluation value corresponding to the candidate performance allocation plan by summing a plurality of sub-evaluation values.

Step 332: adjusting the candidate performance allocation plan based on the evaluation value to obtain an updated candidate performance allocation plan.

In some embodiments, the smart gas safety management platform may increase a performance allocation of first n key monitoring points with a highest sub-evaluation value in the candidate performance allocation plan. Correspondingly, the performance allocation of other key monitoring points is reduced in proportion to obtain the updated candidate performance allocation plan. The value of n may be preset.

In some embodiments, in response to the candidate performance allocation plan not meeting a first iteration completion condition, the candidate performance allocation plan corresponding to the updated evaluation value of a current round of iteration is determined as an initial candidate performance allocation plan of a next round of iteration, and then above iteration is performed. In response to the candidate performance allocation plan meeting a first iteration completion condition, the iteration is terminated.

In some embodiments, the first iteration completion condition may be that a certain count of rounds of iteration is met, or the evaluation value converges, or the evaluation value is less than or equal to a first preset threshold. The converging of the evaluation value refers to that, during a plurality of consecutive rounds of iteration, a difference between the evaluation values of the candidate performance allocation plans in two successive rounds of iteration is less than or equal to a second preset threshold. The count of rounds and the first and second preset thresholds may be manually preset based on experience or defaulted by the IoT system.

Step 340: determining the performance allocation plan for the smart gas safety management platform based on an iteration result.

The iteration result may be, in response to a determination that the first iteration completion condition is met, candidate performance allocation plans for each round of iteration obtained when the iteration is terminated.

In some embodiments, when the first iteration completion condition is met, the iteration may be terminated and the candidate performance allocation plan corresponding to the iteration result with a lowest evaluation value is selected from iteration results as the performance allocation plan for the smart gas safety management platform.

In some embodiments of the present disclosure, the data feature of the key monitoring point is predicted by the data prediction model, and then the candidate performance allocation plan is determined, and then a plurality of rounds of iteration are performed on the candidate performance allocation plan to determine the performance allocation plan for the smart gas safety management platform. In this way, performance is allocated more reasonably and data collection efficiency is ensured while the smart gas safety management platform operates normally.

FIG. 4 is a flowchart illustrating an exemplary process for determining at least one key monitoring point and monitoring content of the at least one key monitoring point according to some embodiments of the present disclosure. In some embodiments, a process 400 may be executed by a smart gas safety management platform.

As shown in FIG. 4, the process 400 includes the following steps.

Step 410: identifying abnormal information in basic monitoring information.

The abnormal information refers to basic monitoring information whose information size is abnormal compared with normal conditions.

In some embodiments, the smart gas safety management platform may identify the abnormal information in various ways. For example, basic monitoring information whose information size exceeds a preset abnormal threshold may be determined as the abnormal information. The preset abnormal threshold may be set manually or by default by the IoT system.

In some embodiments, the smart gas safety management platform may obtain environmental information of at least one pipeline network partition and gas flow information of a gas pipeline in a pipeline corridor, determine a reference information interval based on the environmental information and the gas flow information, and determine the abnormal information based on the basic monitoring information and the reference information interval.

The environmental information refers to information related to an environment of an area where a plurality of pipeline network segments are located, for example, weather conditions, ventilation conditions, or the like.

The gas flow information refers to a ratio of gas flow to time in a certain time period.

In some embodiments, the environmental information may be obtained through weather forecasts and related devices, and the gas flow information may be obtained through a gas meter.

The reference information interval refers to a normal range interval of the basic monitoring information. In some embodiments, the reference information intervals in different situations are different. For example, under different weather conditions, temperature, humidity, and dust conditions in the gas pipeline are different, and thus the reference information intervals are also different. As another example, when the gas flow of the gas pipeline is large, combustible gas content in the pipeline corridor may also be large, and the reference information interval needs to be changed accordingly.

In some embodiments, the smart gas safety management platform may construct a pipeline network monitoring vector based on the environmental information and the gas flow information, and retrieve at least one reference pipeline network monitoring vector whose similarity meets a requirement in a vector database based on the pipeline network monitoring vector, and determine the reference information interval based on basic monitoring data without abnormalities in historical data that correspond to a reference pipeline network monitoring vector. For example, a data range covered by the basic monitoring data without abnormalities is taken as the reference information interval. The similarity meeting a requirement may mean that a vector distance is shorter than a preset distance, etc. The reference pipeline network monitoring vector refers to a vector constructed from historical environmental information and historical gas flow information.

Figure 6:
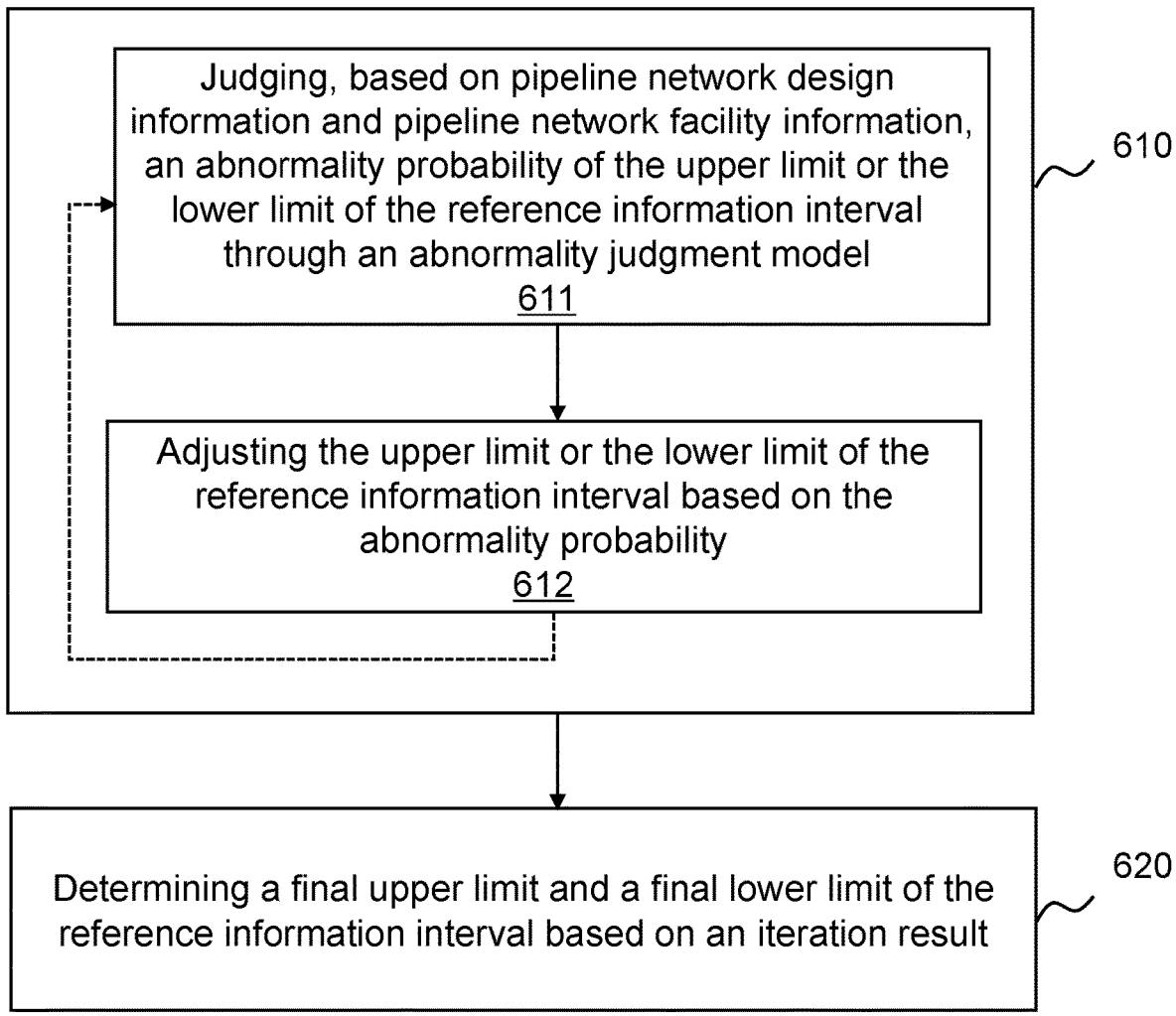
FIG. 6 is a flowchart illustrating an exemplary process for determining a reference information interval according to some embodiments of the present disclosure.

For some other embodiments of determining the reference information interval, please refer to related descriptions of FIG. 6.

In some embodiments, the smart gas safety management platform may determine the basic monitoring information that is not within the reference information interval as the abnormal information.

In some embodiments of the present disclosure, the reference information intervals in different situations are determined in combination with the environmental information and the gas flow information, thus the reference information interval is determined more accurately, thereby improving the accuracy of identifying the abnormal information.

Step 420: determining at least one abnormal information distribution map based on the abnormal information and a pipeline network structure map. In some embodiments, one type of abnormal information corresponds to one abnormal information distribution map.

Figure 5:
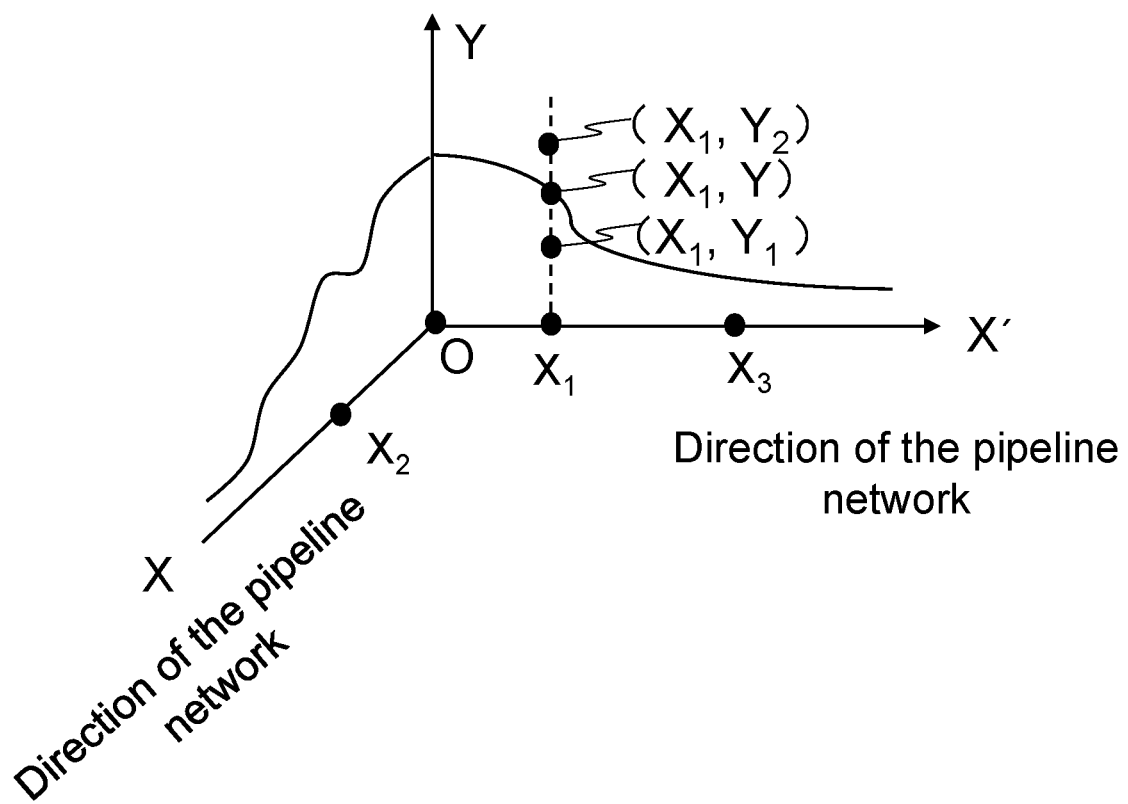
FIG. 5 is an exemplary schematic diagram of an abnormal information distribution map according to some embodiments of the present disclosure.

FIG. 5 is an exemplary schematic diagram of an abnormal information distribution map according to some embodiments of the present disclosure.

In some embodiments, as shown in FIG. 5, for a certain segment of a pipeline network, a coordinate system of the abnormal information distribution map is constructed with an X-X' axis as a schematic direction of the pipeline network and a Y axis as an average value of abnormal information sizes. Monitoring points may include $X_1$, $X_2$, $X_3$, and O. Point O is a possible pipeline network turning point in this segment of the pipeline network, and pipeline network XO and pipeline network X"O are straight pipeline networks. In some embodiments, different abnormal information distribution maps may be drawn corresponding to different pipeline network segments.

The average value of the abnormal information sizes refers to an average value of data of the abnormal information of each monitoring point in the pipeline network at a plurality of time points. For example, for the monitoring point $X_1$, the coordinate on the XX' axis is $X_1$. The abnormal information size at a time point $t_1$ is Y1 (for example, a temperature of 40° C.), and the abnormal information size at a time point $t_2$ is $Y_2$ (for example, a temperature of 60° C.), then Y corresponds to the average value of the abnormal information sizes (for example, a temperature of 50° C.).

In some embodiments, a plurality of discrete monitoring points on the coordinate system of the abnormal information distribution map are smoothly connected, and curve fitting is performed to obtain a continuous abnormal information distribution map.

Step 430: determining the at least one key monitoring point and the monitoring content of the at least one key monitoring point based on the abnormal information distribution map and a gas pipeline feature.

In some embodiments, the smart gas safety management platform may determine a highest point in the abnormal information distribution map and gas pipeline connection points, branch points, historical maintenance points, etc., surrounding the highest point as the key monitoring points and determine corresponding abnormal information as the monitoring content of the key monitoring points. For more information about the surrounding of the key monitoring point, please refer to FIG. 2 and its related descriptions.

In some embodiments, the smart gas safety management platform may determine a change feature of the abnormal information along a direction of the pipeline network based on the abnormal information distribution map, and determine a monitoring point whose change feature meets a preset change condition and an abnormal information type of the monitoring point as the at least one key monitoring point and the monitoring content of the at least one key monitoring point.

The change feature refers to relevant information reflecting a change of the abnormal information, for example, a direction of change of the abnormal information, an amplitude of change of the abnormal information, or the like.

In some embodiments, as shown in FIG. 5, the smart gas safety management platform may solve gradient information of a curve of the abnormal information distribution map on each XOY surface or X'OY surface, and determine the gradient information as a change feature of the abnormal information along the pipeline network.

The preset change condition may include a condition in terms of gradient size or gradient direction, etc., for example, the gradient size is smaller than a preset gradient threshold, the gradient direction is consistent with a preset direction (e.g., decreasing along the direction of the pipeline network), etc. For example, FIG. 5 is an abnormal information distribution map corresponding to an abnormal gas content. If the pipeline network at the monitoring point O and within 10 m of both sides of the point O are abnormal (not in the reference information interval), the monitoring point O has a highest gas content, and the gas content within 10 m of both sides of the monitoring point O decrease along the direction of the pipeline network, indicating that the abnormal gas content near the point O is caused by the abnormality of the monitoring point O (such as gas leakage), and this monitoring point may be used as the key monitoring point.

In some embodiments, the preset change condition may be determined based on the distribution of basic monitoring points near the monitoring points.

The distribution of basic monitoring points refers to a density of distribution of the basic monitoring points. In some embodiments, the distribution of basic monitoring points may be represented by distances between the basic monitoring points.

In some embodiments, when the basic monitoring points are densely distributed, the amplitude of change caused by a diffusion of abnormal information through a natural flow is relatively small. On the contrary, when the basic monitoring points are sparsely distributed and the amplitude of change is large, the corresponding preset change conditions may be set.

In some embodiments, the smart gas safety management platform may increase or decrease a basic preset change condition according to the density of the distribution of the basic monitoring points. The basic preset change condition may be manually preset based on experience. For example, when the distances between the basic monitoring points are large, the smart gas safety management platform may increase the preset gradient threshold set in the basic preset change condition, and keep the preset direction unchanged.

In some embodiments of the present disclosure, the preset change condition is determined based on the distribution of the basic monitoring points near the monitoring point, which can avoid ignoring the abnormality of other monitoring points due to the abnormality of a certain monitoring point (for example, for a certain monitoring point with a leakage problem, if the gas content monitored by two monitoring points with a long distance on a same side of the monitoring point with a leakage problem is similar, there may be other monitoring points with leakage problems between the two monitoring points). In this way, a judgment of abnormal monitoring points is more comprehensive and accurate.

The abnormal information types refer to types of basic monitoring information corresponding to the abnormal information.

In some embodiments, the smart gas safety management platform may determine the monitoring point whose change feature meets the preset change condition and the abnormal information types of the monitoring point as the at least one key monitoring point and the monitoring content of the at least one key monitoring point.

In some embodiments of the present disclosure, the change feature is determined based on the abnormal information distribution map, and then the key monitoring points and the monitoring content of the key monitoring points are determined based on the change feature meeting the preset change condition. In this way, the key monitoring points of each pipeline network segment are determined in a targeted manner, and the accuracy of determining the key monitoring points and the monitoring content of the key monitoring points is improved.

In some embodiments of the present disclosure, the abnormal information distribution map is drawn by identifying the abnormal information in combination with the pipeline network structure map. The accuracy and comprehensiveness of determining the key monitoring points and the monitoring content of the key monitoring points are greatly improved, thereby simultaneously improving the monitoring efficiency and quality of gas pipeline corridors.

FIG. 6 is a flowchart illustrating an exemplary process for determining a reference information interval according to some embodiments of the present disclosure. In some embodiments, a process 600 may be executed by a smart gas safety management platform. As shown in FIG. 6, the process 600 includes the following steps.

Step 610: performing a plurality of rounds of iteration on an upper limit and a lower limit of the reference information interval until a second iteration completion condition is met.

The upper limit and the lower limit of the reference information interval refer to an upper limit and a lower limit of a normal range of basic monitoring information.

In some embodiments, each of the plurality of rounds of iteration may include the following steps:

Step 611: judging, based on pipeline network design information and pipeline network facility information, an abnormality probability of the upper limit or the lower limit of the reference information interval through an abnormality judgment model, the abnormality judgment model being a machine learning model.

The pipeline network design information refers to relevant information on a pipeline network structure and a layout design. For example, the pipeline network design information may include a width, a height, etc., of the pipeline network. In some embodiments, the pipeline network design information may be obtained through a pipeline network structure map.

The pipeline network facility information refers to information about facilities included in the pipeline network, for example, information such as a type, a model, a quantity of the facilities in the pipeline network, etc.

In some embodiments, the smart gas safety management platform may judge the abnormality probability of the upper limit or the lower limit of the reference information interval through the abnormality judgment model.

The abnormality probability refers to a probability of a problem in a pipeline corridor when the basic monitoring information takes the upper limit or the lower limit of the reference information interval.

The abnormality judgment model may be a machine learning model, for example, a convolutional neural network (CNN), etc.

In some embodiments, an input of the abnormality judgment model may include the upper limit or the lower limit of the reference information interval, reference values of other basic monitoring information, the pipeline network design information, and the pipeline network facility information, and an output may include the abnormality probability of the upper limit or the lower limit of the reference information interval. The reference values of other basic monitoring information refer to upper limits or lower limits of the reference information intervals of other basic monitoring information other than the basic monitoring information corresponding to the reference information interval. For example, what is to be judged is the abnormality probability of the upper limit or the lower limit of the reference information interval of temperature, then the reference values of other basic monitoring information may be the upper limits or lower limits of the reference information intervals of the basic monitoring information on humidity, gas content, water level, and dust condition, etc.

In some embodiments, the smart gas safety management platform may determine the upper limits and lower limits of different reference information intervals based on different monitoring points. At this time, the input of the abnormality probability model may also include a point feature of a current monitoring point to be judged. More content about the point feature may be referred to FIG. 7 and related descriptions.

In some embodiments, different point features correspond to different reference information intervals. For example, in a process of gas transmission, due to the usage of gas by upstream users, an amount of gas transmitted downstream may decrease, so the normal range of monitoring information such as temperature, gas pressure, and combustible gas content at points located downstream of the gas transmission may be different.

In some embodiments of the present disclosure, the point feature of the current monitoring point to be judged is input into the abnormality judgment model, and the upper limit and the lower limit of the reference information interval of different monitoring points may be determined, so as to improve the accuracy of the reference information interval.

In some embodiments, the abnormality judgment model may be trained through positive and negative training samples. The positive training samples may be samples with abnormalities, and the negative training samples may be samples without abnormalities. In some embodiments, the training samples may at least include an upper limit or a lower limit of a sample reference information interval in historical data, reference values of sample other basic monitoring information, sample pipeline network design information, and sample pipeline network facility information. In some embodiments, the training samples may also include the point feature of a sample current monitoring point to be judged in the historical data. Labels may be determined based on the historical data, the label of the positive training samples may be 1, and the label of the negative training sample may be 0.

Step 612: adjusting the upper limit or the lower limit of the reference information interval based on the abnormality probability.

In some embodiments, the smart gas safety management platform may adjust the upper limit and/or the lower limit of the reference information interval whose abnormality probability is higher than a preset value up or down according to a preset step size. For example, when the abnormality probability corresponding to the upper limit of the reference information interval is higher than a second preset threshold, the upper limit of the reference information interval is adjusted up with the preset step size, or the upper limit of the reference information interval is adjusted down with the preset step size. If the abnormality probability becomes larger after the upper limit of the reference information interval in a previous iteration is adjusted up, then this time the upper limit of the reference information interval is adjusted down. If the abnormality probability becomes smaller after the upper limit of the reference information interval in the previous iteration is adjusted up, then the upper limit of the reference information interval is continued to be adjusted up this time.

In some embodiments, in response to a second iteration completion condition being not met, the smart gas safety management platform determines an upper limit or a lower limit of a reference information interval corresponding to an abnormality probability updated in a latest round of iteration as an initial upper limit or an initial lower limit of a reference information interval in a next round of iteration and performs the iteration. In response to the second iteration completion condition being met, the iteration is terminated.

In some embodiments, the second iteration completion condition may be that a certain count of rounds of iteration is met, or the abnormality probability converges, or the abnormality probability is less than or equal to a third preset threshold. The converging of the abnormality probability refers to that, during a plurality of consecutive rounds of iteration, a difference of the abnormality probabilities between the upper limits or the lower limits of the reference information intervals of two successive rounds of iteration is less than or equal to a fourth preset threshold. The count of rounds and the third and fourth preset thresholds may be preset manually based on experience or by default by the IoT system.

Step 620: determining a final upper limit and a final lower limit of the reference information interval based on an iteration result.

The iteration result may be, in response to the second iteration completion condition being met, the upper limit or the lower limit of the reference information interval of each iteration round obtained when the iteration is terminated.

In some embodiments, when the second iteration completion condition is that the abnormality probability meets the second preset threshold, the iteration result may be confirmed as the final upper limit and the final lower limit of the reference information interval. In some embodiments, when the second iteration completion condition is that a certain count of rounds of iteration is met, or the abnormality probability converges, the upper limit or the lower limit of the reference information interval with the smallest abnormality probability among the upper limit or the lower limit of the reference information interval of each round of iteration may be determined as the final upper or the final lower limit of the reference interval.

In some embodiments of the present disclosure, by updating the upper limit and lower limit of the reference interval through a plurality of rounds of iteration, accurate upper limit and lower limit of the reference information interval may be obtained, which is conducive to subsequent determination of more accurate abnormal information.

FIG. 7 is a flowchart illustrating an exemplary process for determining an inspection plan according to some embodiments of the present disclosure. In some embodiments, a process 700 may be executed by a smart gas safety management platform. As shown in FIG. 7, the process 700 includes the following steps:

Step 710: determining at least one candidate inspection robot combination based on spatial information and monitoring content of at least one key monitoring point.

The spatial information refers to a spatial size of the key monitoring point, which is used to determine a largest inspection robot that may be accommodated.

In some embodiments, the candidate inspection robot combination may include required different types of inspection robots and a specific number of each inspection robot. For example, the candidate inspection robot combination may include a No. 1 gas inspection robot, a No. 2 gas inspection robot, a No. 3 gas inspection robot, a No. 1 temperature inspection robot, a No. 1 humidity inspection robot, and a No. 1 composite inspection robot that includes the gas inspection function.

In some embodiments, the smart gas safety management platform may determine the types of inspection functions of available inspection robots and their available quantity ranges according to the spatial information and the monitoring content of key monitoring points. According to a quantity range of current available inspection robots for each type of inspection function, the inspection robot combination is generated by permutation and combination. The quantity range may be no more than n, and n is a smaller value of the count of inspection robots available for a type of inspection function and the count of the key monitoring points that need to be inspected for this type. For example, if the count of available inspection robots with gas inspection function is 3, and the key monitoring points that need to be performed gas inspection are 10, then the available quantity range is not more than 3. Therefore, the inspection robot combination may be generated by permutation and combination.

Step 720: determining an inspection plan for each of the at least one candidate inspection robot combination. Determining the inspection plan for each set of the at least one candidate inspection robot combination may include the following steps:

Step 721: generating a corresponding inspection route based on a location of each inspection robot in the candidate inspection robot combination.

The inspection route refers to a route passed by the inspection robot during an inspection process.

In some embodiments, the smart gas safety management platform may determine the inspection route in various ways. For example, the smart gas safety management platform may randomly generate m candidate inspection routes and then determine the candidate inspection route with a shortest total distance among the m candidate inspection routes as the inspection route. A value of m may be preset.

In some embodiments, the smart gas safety management platform may instruct the each inspection robot in the candidate inspection robot combination to start from a location of the each inspection robot to a target inspection point, perform inspection on the target inspection point, and repeat above operations until a preset inspection condition is met; and determine the route passed by the inspection robot as the inspection route corresponding to the inspection robot.

The target inspection point refers to an inspection point closest to the location of the inspection robot that has not been inspected in a same type of inspection function.

In some embodiments, there may be a plurality of inspection robots in each type of inspection function. When determining the target inspection point of one of the inspection robots, first the key monitoring points that have been inspected are calculated based on an inspection distance, a movement speed, and a time required to inspect a point by other inspection robots. From remaining key monitoring points that have not been inspected, the key monitoring point closest to the inspection robot is selected and determined as a next target inspection point. The inspection distance refers to a length of a pipeline. For example, for robots 1, 2, and 3 of a same type of inspection function, according to the inspection distance of inspection robot 2, the movement speed of inspection robot 2, and the time required for inspection robot 2 to inspect a key monitoring point, the monitoring points that the inspection robot 2 has inspected are calculated, and in the same way, the monitoring points that the inspection robot 3 has inspected are also calculated. Then the inspection robot 1 selects the key monitoring point closest to the inspection robot 1 from the remaining key monitoring points as its next target inspection point.

The preset inspection condition refers to a preset condition for the inspection robot to stop inspection. In some embodiments, the preset inspection condition may be that all target inspection points have been traversed.

In some embodiments of the present disclosure, the inspection route with the shortest total distance may be determined based on the above manner, ensuring that a better inspection plan may be determined subsequently.

Step 722: evaluating an inspection cost of the candidate inspection robot combination and the inspection route of the candidate inspection robot combination.

In some embodiments, the inspection cost refers to a numerical value used to evaluate pros and cons of the candidate inspection robot combinations and the inspection routes of the candidate inspection robot combinations. The lower the inspection cost, the better the candidate inspection robot combination and the inspection route of the candidate inspection robot combination.

In some embodiments, the smart gas safety management platform may evaluate the inspection cost in various ways, for example, searching a preset relationship comparison table based on the candidate inspection robot combination and the inspection route of the candidate inspection robot combination.

In some embodiments, the inspection cost may include a first cost, a second cost, and a third cost. The smart gas safety management platform may perform a weighted summation on the first cost, the second cost, and the third cost to determine the inspection cost.

The first cost refers to a cost of using the inspection robot. In some embodiments, the first cost may be related to a count of the inspection robots in the candidate inspection robot combination. For example, the fewer inspection robots that need to be used, the lower the first cost.

The second cost refers to a time cost of the inspection route. In some embodiments, the second cost may be related to an inspection duration corresponding to the inspection route. For example, the shorter the inspection duration, the lower the second cost.

The third cost refers to a distance cost of the inspection route. In some embodiments, the third cost may be related to a total inspection distance corresponding to the inspection route. For example, the shorter the total inspection distance, the lower the third cost.

In some embodiments, the first, second, and third costs may be represented by any value between 0 and 10, and the first, second, and third costs may be determined based on a preset relationship comparison table. In some embodiments, the inspection cost may be determined based on a weighted summation of the first cost, the second cost, and the third cost, wherein weights of the first cost, the second cost, and the third cost may be set in advance, and the weight of the second cost is the highest.

In some embodiments of the present disclosure, the smart gas safety management platform may perform the weighted summation of the first cost, the second cost, and the third cost to determine the inspection cost more accurately and further obtain the inspection plan more effectively.

In some embodiments, the inspection cost may also be related to a fourth cost. The fourth cost may be determined based on a fourth sub-cost of the at least one key monitoring point, and the fourth sub-cost may be determined based on a point feature and the inspection duration of each key monitoring point in the at least one key monitoring point.

In some embodiments, the smart gas safety management platform may determine the fourth cost based on the fourth sub-cost of the key monitoring point. For example, the lower the fourth sub-cost of a plurality of monitoring points is, the lower the fourth cost of the inspection plan is.

In some embodiments, the smart gas safety management platform may determine the fourth sub-cost based on the point feature and the inspection time of key monitoring point. For example, the higher the density in the point feature and the more downstream the point, the earlier the inspection time, and the smaller the corresponding fourth sub-cost.

The point feature refers to a feature that may represent information on the key monitoring points. In some embodiments, the point feature may include a pipeline density of the key monitoring point, and a downstream transmission distance corresponding to the key monitoring point. The pipeline density refers to a count of pipelines per unit area around a certain key monitoring point. The downstream transmission distance refers to a length of a pipeline between the key monitoring point and a transmission starting point (for example, a gas storage station, a point where gas enters a pipeline network partition) of a pipeline corridor.

In some embodiments, the smart gas safety management platform may perform a weighted summation on the pipeline density of the key monitoring points and the downstream transmission distance of the key monitoring points to determine the fourth sub-cost.

Since the key monitoring points of a downstream pipeline are inspected first, if there is no problem with the key monitoring points of the downstream pipeline, there is a high probability that there is no problem with upstream points. For a key monitoring point with a high-priority inspection intensity, if there is no problem with the key monitoring point, there is a high probability that there may be no problem with the surrounding key monitoring points. Therefore, the higher the density in the point feature and the more downstream the point, the earlier the inspection time, and the smaller the corresponding fourth sub-cost.

In some embodiments, the smart gas safety management platform may determine the weights according to preset values or preset rules. For example, the weights of the key detection points in different inspection orders are set according to an arithmetic sequence of tolerances, and the lower the order, the greater the weight.

In some embodiments, the fourth cost may be determined according to an average value of the fourth sub-costs of a plurality of points where the inspection robot goes to.

In some embodiments, the inspection cost may also be determined based on the weighted summation of the first cost, the second cost, the third cost, and the fourth cost.

In some embodiments of the present disclosure, the inspection cost may also take into account the fourth cost, so that a more accurate inspection cost and a more accurate inspection plan may be obtained.

Step 723: determining the inspection plan based on the inspection cost.

In some embodiments, the smart gas safety management platform may determine the inspection plan in various ways. For example, the smart gas safety management platform may determine the inspection plan with a lowest inspection cost as a final inspection plan.

In some embodiments, the smart gas safety management platform may use the candidate inspection robot combination with the lowest inspection cost and the inspection route of the candidate inspection robot combination in the inspection plans with the second cost lower than an upper time limit as the inspection plan.

The upper time limit refers to a maximum value of the inspection duration of the inspection robot. In some embodiments, the upper time limit may be related to an average value of differences between abnormal information of the at least one key monitoring point and reference information intervals.

In some embodiments, the difference between the abnormal information and the reference information interval refers to the difference between the value of the abnormal information and the value of the reference information interval. The difference between the value of the abnormal information and the value of the reference information interval may be a smaller absolute value of the difference between two absolute values. One of the absolute values is an absolute value of the difference between the value of the abnormal information and an upper limit of the reference information interval. The other of the absolute values is an absolute value of the difference between the value of the abnormal information and a lower limit of the reference information interval.

In some embodiments of the present disclosure, the smart gas safety management platform determines the inspection plan by taking into account the upper time limit related to the difference between the abnormal information and the reference information interval, so that the determined inspection plan is more accurate.

In some embodiments of the present disclosure, the smart gas safety management platform determines the inspection plan based on the at least one key monitoring point, the monitoring content of the at least one key monitoring point, and basic monitoring information, so inspection effect of the inspection robot may be optimized to further generate an accurate alarm message.

One of one or more embodiments of the present disclosure provides a non-transitory computer-readable storage medium, which stores computer instructions, and when the computer reads the computer instructions in the storage medium, the computer implements the method for safety management of the smart gas underground gas pipeline network.

In addition, certain features, structures, or characteristics in one or more embodiments of the present disclosure may be properly combined.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

What is claimed is:

1. A method for safety management of a smart gas underground gas pipeline network implemented by a smart gas safety management platform, wherein the method comprises:

obtaining basic monitoring information of at least one pipeline network partition collected by distributed monitoring components arranged at a plurality of monitoring points, the basic monitoring information being collected at a preset monitoring frequency;

generating at least one key monitoring point and monitoring content of the at least one key monitoring point based on the basic monitoring information, a pipeline network structure map, and a gas pipeline feature in a pipeline corridor;

determining an inspection plan and a performance allocation plan for the smart gas safety management platform based on the at least one key monitoring point and the monitoring content of the at least one key monitoring point and the basic monitoring information, the inspection plan being executed by at least one type of inspection robot, the performance allocation plan for the smart gas safety management platform at least including a maximum performance occupancy of the smart gas safety management platform for processing monitoring data, and the monitoring data referring to data in areas where different key monitoring points are located;

adjusting the preset monitoring frequency of the distributed monitoring components located at the different key monitoring points and areas surrounding the different key monitoring points based on the performance allocation plan for the smart gas safety management platform;

generating an alarm message to be sent to a user terminal based on an inspection result of the inspection robot; wherein determining the performance allocation plan for the smart gas safety management platform includes:

predicting a data feature of the at least one key monitoring point through a data prediction model based on the at least one key monitoring point and the monitoring content of the at least one key monitoring point;

determining a candidate performance allocation plan according to a proportion of an amount of data transmitted to the smart gas safety management platform within a same time period based on the data feature;

performing a plurality of rounds of iteration on the candidate performance allocation plan until a first iteration completion condition is met;

determining the performance allocation plan for the smart gas safety management platform based on an iteration result;

wherein each of the plurality of rounds of iteration includes:

calculating an evaluation value of the candidate performance allocation plan; and adjusting the candidate performance allocation plan based on the evaluation value to obtain an updated candidate performance allocation plan, the evaluation value including a plurality of sub-evaluation values, and the sub-evaluation values being related to data collection efficiency of the at least one key monitoring point.

2. The method according to claim 1, wherein the generating at least one key monitoring point and monitoring content of the at least one key monitoring point based on the basic monitoring information, a pipeline network structure map, and a gas pipeline feature in a pipeline corridor includes:

identifying abnormal information in the basic monitoring information;

determining at least one abnormal information distribution map based on the abnormal information and the pipeline network structure map; and determining the at least one key monitoring point and the monitoring content of the at least one key monitoring point based on the abnormal information distribution map and the gas pipeline feature.

3. The method according to claim 2, wherein the determining the at least one key monitoring point and the monitoring content of the at least one key monitoring point based on the abnormal information distribution map and the gas pipeline feature includes:

determining a change feature of the abnormal information along a direction of a pipeline network based on the abnormal information distribution map; and determining a monitoring point whose change feature meets a preset change condition and an abnormal information type of the monitoring point as the at least one key monitoring point and the monitoring content of the at least one key monitoring point.

4. The method according to claim 2, wherein the identifying abnormal information in the basic monitoring information includes:

obtaining environmental information of the at least one pipeline network partition and gas flow information of a gas pipeline in the pipeline corridor;

determining a reference information interval based on the environmental information and the gas flow information; and determining the abnormal information based on the basic monitoring information and the reference information interval.

5. The method according to claim 4, wherein the determining a reference information interval includes:
performing a plurality of rounds of iteration on an upper limit and a lower limit of the reference information interval until a second iteration completion condition is met; and
determining a final upper limit and a final lower limit of the reference information interval based on an iteration result; and
wherein each of the plurality of rounds of iteration includes:
judging, based on pipeline network design information and pipeline network facility information, an abnormality probability of the upper limit or the lower limit of the reference information interval through an abnormality judgment model, the abnormality judgment model being a machine learning model; and
adjusting the upper limit or the lower limit of the reference information interval based on the abnormality probability.

6. The method according to claim 1, wherein the determining an inspection plan based on the at least one key monitoring point and the monitoring content of the at least one key monitoring point and the basic monitoring information includes:
determining at least one candidate inspection robot combination based on spatial information and the monitoring content of the at least one key monitoring point; and
for each of the at least one candidate inspection robot combination,
generating a corresponding inspection route based on a location of each inspection robot in the candidate inspection robot combination;
evaluating an inspection cost of the candidate inspection robot combination and the inspection route of the candidate inspection robot combination; and
determining the inspection plan based on the inspection cost.

7. A device for safety management of a smart gas underground gas pipeline network, wherein the device comprises at least one processor and at least one memory;
the at least one memory is used to store computer instructions; and
the at least one processor is used to execute at least part of the computer instructions to implement the method according to claim 1.

8. An Internet of Things (IoT) system for safety management of a smart gas underground gas pipeline network, wherein the IoT system comprises a smart gas user platform, a smart gas service platform, a smart gas safety management platform, a smart gas pipeline network device sensing network platform, and a smart gas pipeline network device object platform that interact in sequence, and the smart gas safety management platform is configured to:
obtain basic monitoring information of at least one pipeline network partition collected by distributed monitoring components arranged at a plurality of monitoring points based on the smart gas pipeline network device object platform through the smart gas pipeline network device sensor network platform, the basic monitoring information being collected at a preset monitoring frequency;
generate at least one key monitoring point and monitoring content of the at least one key monitoring point based on the basic monitoring information, a pipeline network structure map, and a gas pipeline feature in a pipeline corridor;
determine an inspection plan and a performance allocation plan for the smart gas safety management platform based on the at least one key monitoring point and the monitoring content of the at least one key monitoring point and the basic monitoring information, and the inspection plan being executed by at least one type of inspection robot, the performance allocation plan for the smart gas safety management platform at least including a maximum performance occupancy of the smart gas safety management platform for processing monitoring data, and the monitoring data referring to data in areas where different key monitoring points are located;
adjust the preset monitoring frequency of the distributed monitoring components located at different key monitoring points and at areas surrounding the different key monitoring points based on the performance allocation plan for the smart gas safety management platform; and
generate an alarm message based on an inspection result of the inspection robot and send the alarm message to the smart gas user platform through the smart gas service platform; wherein
the smart gas safety management platform is configured to:
predict a data feature of the at least one key monitoring point through a data prediction model based on the at least one key monitoring point and the monitoring content of the at least one key monitoring point;
determine a candidate performance allocation plan according to a proportion of an amount of data transmitted to the smart gas safety management platform within a same time period based on the data feature;
perform a plurality of rounds of iteration on the candidate performance allocation plan until a first iteration completion condition is met;
determine the performance allocation plan for the smart gas safety management platform based on an iteration result; and
wherein each of the plurality of rounds of iteration includes:
calculating an evaluation value of the candidate performance allocation plan; and
adjusting the candidate performance allocation plan based on the evaluation value to obtain an updated candidate performance allocation plan, the evaluation value including a plurality of sub-evaluation values, and the sub-evaluation values being related to data collection efficiency of the at least one key monitoring point.

9. The Internet of Things system according to claim 8, wherein the smart gas safety management platform includes a smart gas pipeline network safety management sub-platform and a smart gas data center, the smart gas pipeline network safety management sub-platform interacts with the smart gas data center in both directions, and the smart gas pipeline network safety management sub-platform obtains data from the smart gas data center and feeds back operation information corresponding to the data.

* * * * *